April 13, 1926.
W. J. ROE
1,581,019
DETACHABLE TOOTH SECTION FOR SAW BLADES
Filed April 28, 1925
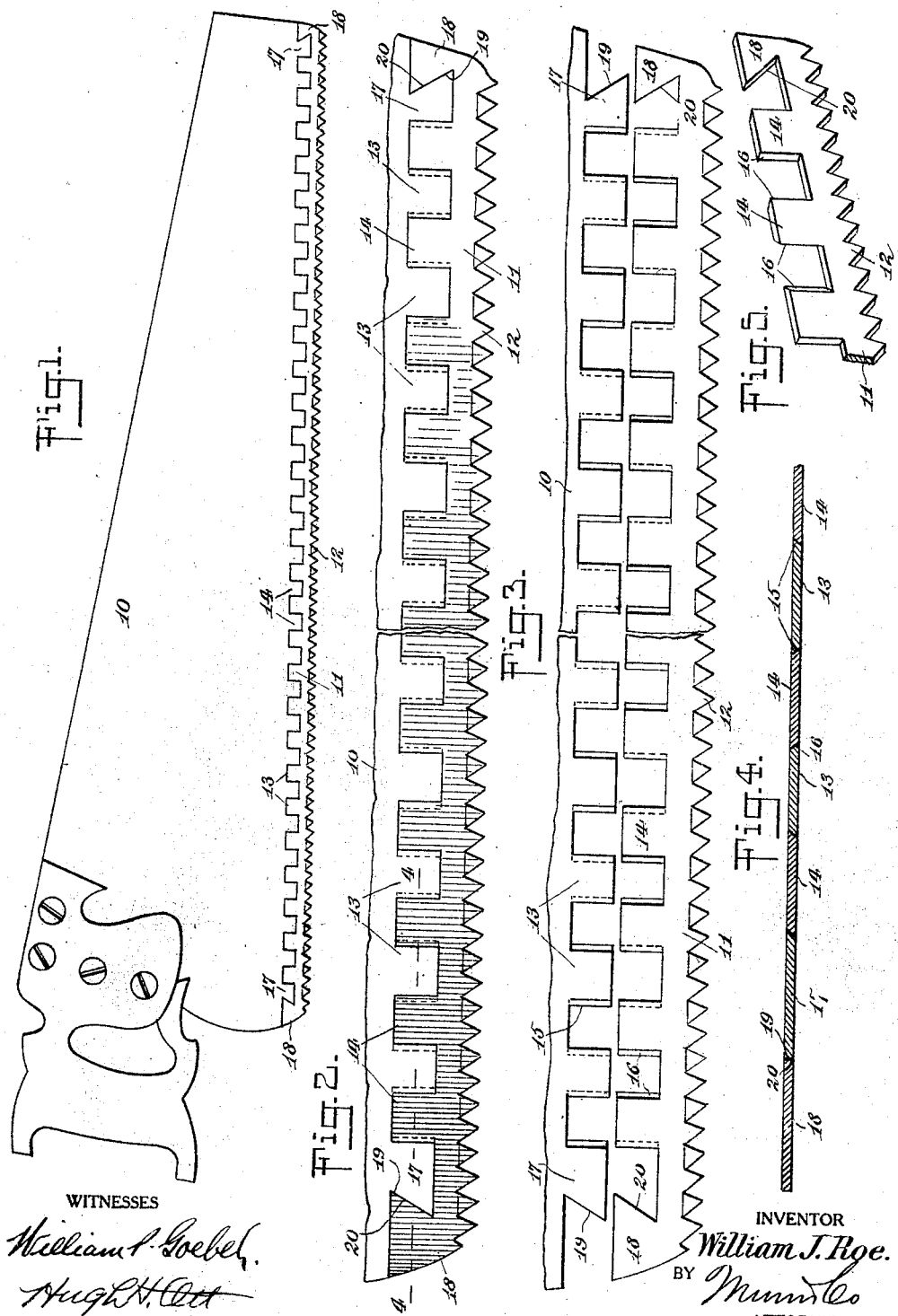
WITNESSES
INVENTOR
William J. Roe.
BY
ATTORNEYS Patented Apr. 13, 1926.

1,581,019

UNITED STATES PATENT OFFICE.

WILLIAM JAMES ROE, OF NEWBURGH, NEW YORK.

DETACHABLE TOOTH SECTION FOR SAW BLADES.

Application filed April 28, 1925. Serial No. 26,454.

*To all whom it may concern:*

Be it known that I, WILLIAM JAMES ROE, a citizen of the United States of America, and resident of Newburgh, in the county of Orange and State of New York, have invented a new and Improved Detachable Tooth Section for Saw Blades, of which the following is a full, clear, and exact description.

This invention relates to saws and aims as its object to provide a saw having a removable tooth section whereby when the teeth become dull the section may be replaced in lieu of sharpening the teeth.

More specifically the invention comprehends as an object an improved means of connection between the removable or replaceable section and the body of the blade of the saw which means in addition to forming a positive and effectual connection between the removable section does not increase the thickness of the blade.

As a still further object the invention contemplates a saw having a blade provided with a detachable tooth section which is comparatively simple in its construction, inexpensive to manufacture, highly efficient in its purpose and which facilitates the application to and removal of the detachable section from the stationary section of the blade.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a side view of a saw constructed in accordance with the invention.

Fig. 2 is an enlarged detail fragmentary side view thereof with the detachable section in applied position.

Fig. 3 is a similar view illustrating the detachable section removed from the body of the blade.

Fig. 4 is a fragmentary horizontal sectional view taken approximately on the line 4—4 of Fig. 2.

Fig. 5 is a fragmentary perspective view of one end of the detachable section.

Referring to the drawings by characters of reference 10 designates the body of a saw blade and 11 the detachable tooth section thereof which is formed along one edge with the usual saw teeth 12. The mating edges of the sections 10 and 11 are respectively provided with interengaging or mating fingers 13 and 14, which fingers are spaced apart longitudinally and are respectively provided on their side edges with complementary bevels 15 and 16. This construction of the fingers permits of relative sliding movement of the sections 10 and 11 in the same plane to engage or disengage the fingers but prevents lateral or longitudinal relative movement thereof to displace the sections when engaged.

In order to provide means for locking the sections against relative separation when the fingers are properly engaged, the outermost or end fingers 17 and 18 of the sections 10 and 11 are provided with complementary angularly disposed or inclined walls 19 and 20 respectively, which are engaged by a lateral flexing of the terminals of the section 11 after the remaining fingers have been fully engaged. The elasticity or inherent resiliency of the material from which the section 11 is constructed serves as a means for preventing accidental flexure when the saw is in use thereby functioning as an effective lock. It will be noted that the beveled side edges 15 and 16 are alternately disposed on the fingers in different directions so that they act to prevent lateral displacement in opposite directions. From this construction and arrangement it is also obvious that a single stationary section or blade body 10 may have associated therewith removable or detachable sections 11 provided with teeth of different characters so that the saw may be converted from a cross cut to a rip or metal cutting saw without in any way departing from the spirit of the invention.

I claim:

1. A saw comprising a blade having a body section, a detachable tooth section, and detachable means of connection therebetween, consisting of longitudinally spaced mating fingers on the body and tooth section, the side edges of the alternate fingers of each section being oppositely beveled whereby to define between the fingers of one section substantially dovetail shaped receiving notches for the fingers of the opposite section, whereby when the sections are connected by engaging the fingers in mating relation the said sections are maintained against lateral and longitudinal relative movements.

2. A saw comprising a blade body section, a tooth section and longitudinally spaced fingers on the mating edges of said sections provided with laterally beveled alternately arranged complementary side edges engageable and disengageable by relative sliding movement of the sections in the same plane and means at the opposite free ends of said sections for locking the same when the fingers are fully engaged against relative sliding movement in the same plane.

3. A saw comprising a blade body section, a tooth section and longitudinally spaced fingers on the mating edges of said sections provided with laterally beveled alternately arranged complementary side edges engageable and disengageable by relative sliding movement of the sections in the same plane and means at the opposite free ends of said sections for locking the same when the fingers are fully engaged against relative sliding movement in the same plane, said latter means consisting of terminal fingers having angularly disposed mating faces engageable and disengageable by lateral flexing of the terminals of the removable section.

4. A deatchable tooth section for saw blades comprising in combination with a saw blade body having longitudinally spaced fingers, the intermediate fingers of which are formed with alternately oppositely laterally beveled side edges and the end fingers of which are formed with angularly disposed outermost walls, the said detachable section having complementary formed intermediate fingers and outermost or end fingers provided with angularly disposed inner walls, engageable and disengageable upon lateral flexing of the terminals of said section.

WILLIAM JAMES ROE.